May 8, 1956
C. A. STRAYER
2,744,802
PISTON SEALING ASSEMBLY
Filed Sept. 19, 1952
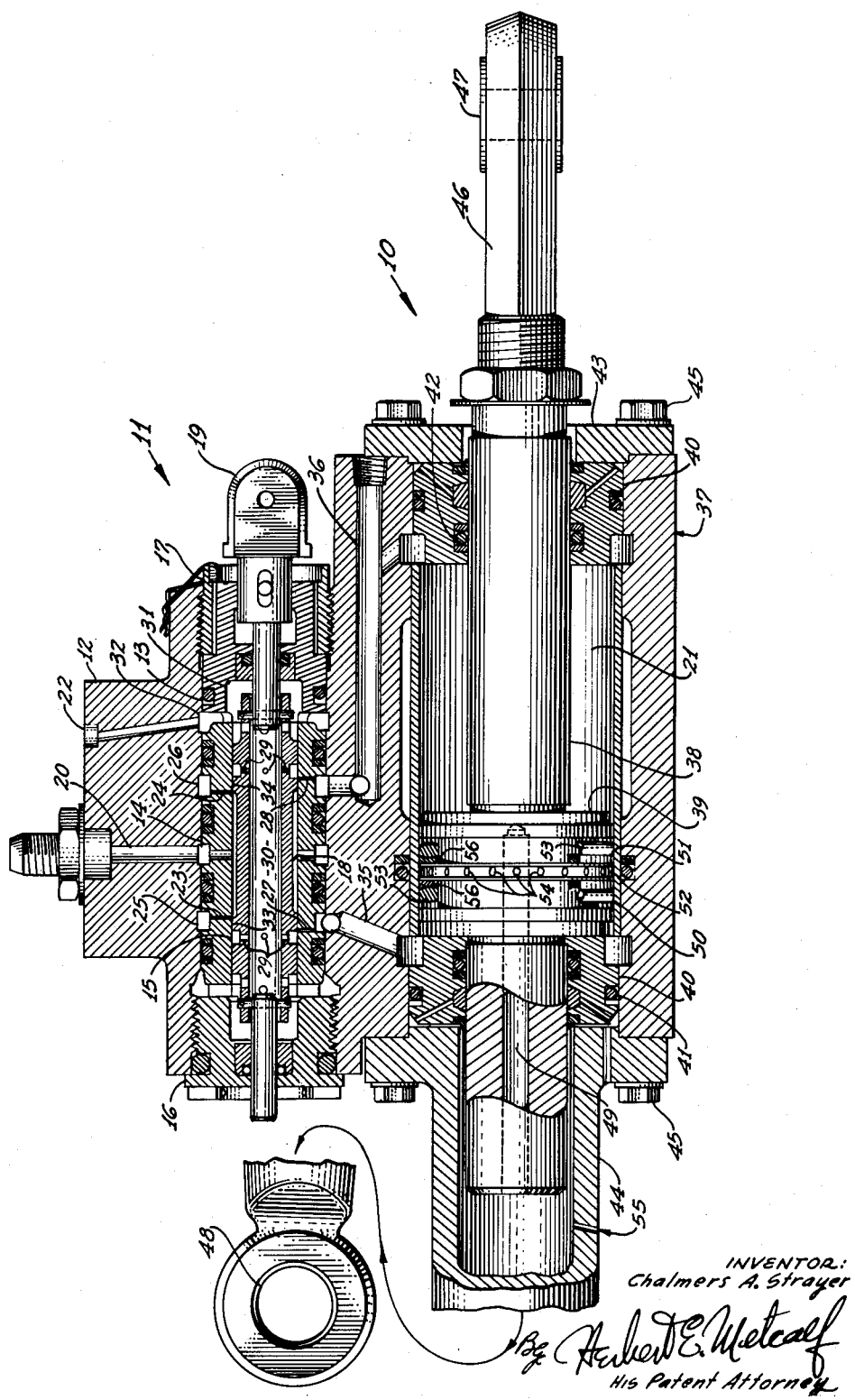
INVENTOR:
Chalmers A. Strayer
By Herbert E. Metcalf
His Patent Attorney

United States Patent Office 2,744,802
Patented May 8, 1956

2,744,802

PISTON SEALING ASSEMBLY

Chalmers A. Strayer, Torrance, Calif., assignor to Northrop Aircraft, Inc., Hawthorne, Calif., a corporation of California Application September 19, 1952, Serial No. 310,474

1 Claim. (Cl. 309—4)

This invention relates to hydraulic actuators and more particularly to actuators in which a dual seal is provided between its piston and associated working cylinder whereby the piston is accurately and instantly responsive to fluid pressure changes within the cylinder.

A dual piston seal, as mentioned above, is designed to operate with a hydraulic actuator of the type U. S. Patent No. 2,612,872, in which fluid pressure is continuously maintained on each side of the working piston, thereby virtually locking the piston and piston rod in place against shock loads. An actuator, as disclosed in the above application, in which the piston is provided with only one sealing ring, is objectional as it will not respond instantly when a pressure differential occurs at opposite sides thereof. This delay is occasioned by a slight shifting and compressing of its sealing ring before it provides a positive seal. This delay or time lag is well known in the art and needs only a brief explanation in this disclosure.

As the fluid pressure is varied on opposite sides of a piston, utilizing a conventional single sealing ring, a small amount of fluid from the high pressure side of the cylinder is forced by the peripheral portion of the piston and impinges against the sealing ring. As sealing rings are normally constructed of a material which is yielding in character they are first compressed, when contacted by the fluid under pressure, between a side wall of the groove in which it is positioned and the cylinder wall of the actuator, thereby forming a positive seal and a subsequent movement of the piston. Upon reversal of the fluid pressure, the sealing ring shifts slightly in its groove in the opposite direction, is again compressed, this time against the opposite side wall of the groove in which it is positioned and the cylinder wall, before a positive seal is again provided and a consequent movement of the piston in the opposite direction. Such a delay or time-lag in a hydraulic system, generally referred to as the "mass-modulus" of the system, is comparable with back lash in a mechanical system.

Although a time lag as described above may be very small it is extremely objectional, particularly when the actuator is utilized to move control surfaces of a high speed airplane or missile traveling at sonic or supersonic speeds, as is the case in the present disclosure. Many actuators, in modern planes and missiles, are controlled by electric impulses and if these impulses are not accurately and instantly transmitted to the control surfaces the plane or missile will not follow a predetermined or plotted course.

It is, therefore, an object of the present invention to provide an efficient and economical hydraulic actuator in which the piston associated therewith will respond instantly to fluid pressure changes within the actuator cylinder.

Although the present invention is disclosed in connection with a neutral leakage control valve and hydraulic cylinder for moving the aileron control surfaces of an airplane, it will be understood that the invention may be modified and embodied in various other forms in which fluid pressure is always present on both sides of the working piston.

Briefly the present invention may be practiced by providing the piston in the working cylinder of a hydraulic actuator with dual sealing rings and venting the peripheral surface of the piston between the rings to normal atmospheric pressure or a pressure which is below that of the fluid in the working cylinder. As the fluid pressure on each side of the working piston greatly exceeds atmospheric pressure the sealing rings will remain permanently compressed against the inner side walls of their respective grooves. In this position they maintain a positive seal during the operating cycle of the actuator, a change in pressure on either side of the piston resulting in an instantaneous movement thereof.

The invention will be more fully understood by reference to the accompanying drawing which is a longitudinal sectional view of a hydraulic actuator embodying the invention.

Referring now to the drawings, an actuator embodying this invention may comprise a cylinder assembly 10 and a valve assembly 11, the latter being secured to the cylinder assembly or it may be an integral part thereof. The valve assembly comprises a housing 12 provided with a longitudinal bore 13, a cylindrical sleeve element 14, provided with a co-axial bore 15, fixedly secured in the bore 13 by bushings 16 and 17 located at each end thereof.

A valve spool 18 is mounted for limited axial movement in the bore 15. A connecting element 19, is attached to the spool and extends from one end of housing 12 for connection to an operating means, e. g., aileron cables (not shown) through suitable connecting linkage (not shown). Suitable annular fluid grooves and radially extending passageways, provided in sleeve element 14 and spool 18, define a fluid flow path through the valve assembly from its inlet port 20 to each end of the cylinder chamber 21 and to return port 22.

In the neutral position of the valve, shown in the drawing, hydraulic fluid enters the valve assembly through inlet port 20, flows through metering holes 23 and 24 to annular grooves 25 and 26 in equal proportions. Fluid in the grooves 25 and 26 may flow to either end of the cylinder's chamber via passageways 35 and 36, or, in the spool's neutral position, maintain an equal pressure at both ends of the chamber. Fluid from annular grooves 25 and 26 returns to outlet port 22 via metering holes 27 and 28, radially extending holes 29 in spool 18, co-axial bore 30, which is coextensive with spool 18, chamber 31, and annular groove 32. On movement of the valve spool in either direction it is apparent that a path for fluid flow is provided to one end of cylinder 21 only and a path for return flow from the other. For example, if the spool is moved to the left of its neutral position, metering hole 23 will be uncovered by land 33 permitting flow to cylinder 21 via passageway 35, simultaneously land 34 will close metering hole 24 and open hole 28 to return flow from passageway 36.

The cylinder assembly comprises a hollow cylindrical casing 37 having a longitudinally extending bore or cylinder chamber 21, mounted co-axially of chamber 21 is a piston 39 and piston rod 38, the latter extending from both ends of the housing. The piston rod is supported at each end of the housing by means of bushings 40 through which the rod extends, sealing rings 41 and 42 positioned between the casing and bushings and piston rod and bushings, respectively, renders chamber 21 fluid tight, yet permits the piston rod to move in an axial direction. Bushings 40 are held in position by means of an end plate 43 and a flanged cup element 44, both the plate and cup element being retained in place by cap screws 45.

An end assembly 46 is attached to the end of piston rod 38 which projects from cylinder housing 37 opposite cup element 44. Assembly 46 is provided with an eye 47 by means of which the assembly may be pivotally attached to a non-movable structural element of an airplane. Cup shaped element 44 is likewise provided with an eye 48 by means of which the actuator may be pivotally secured to an aileron pivot fitting (not shown). A coaxial bore 49 extends within piston rod 38 from a point adjacent piston 39 to the end of said rod adjacent cup element 44.

In one preferred embodiment of the present invention, the outer peripheral surface of piston 39 is provided with three circumferential grooves 50, 51, and 52 extending in parallel relationship with respects to themselves and the side faces of the piston. The two non-adjacent grooves 50 and 51 are provided with conventional sealing rings 53, which may be of the O-ring or other type as desired. A plurality of radially extending passageways 54 connect the central groove 52 with the bore 49 of the piston rod.

In addition to the rings 53 a backing or non-extrusion ring is positioned in each of the grooves 50 and 51. One of the backing rings is located in groove 50 between the backing ring 53 and the side wall of this groove most adjacent groove 51, the other backing ring is similarly located in groove 51. On the drawing, these additional packing rings are designated by the reference numeral 56. Cup element 44 is also provided with an aperture 55, thus the peripheral portion of the piston, between grooves 50 and 51 including central groove 52, is vented to normal atmospheric pressure or a pressure which is less than the fluid pressure in chamber 21, through radial passageways 54, axial bore 49, and aperture 55.

In operation fluid is admitted to chamber 21, by means of valve assembly 11, through passageway 35 or 36. At this time that portion of sealing rings 53 facing the vertical side faces of piston 39 are subjected to fluid contained in chamber 21 at super-atmospheric pressure, while their portions adjacent backing ring 56 and central groove 52 is vented to normal atmospheric pressure or a pressure which is less than the fluid pressure in chamber 21. Accordingly the sealing rings are compressed and firmly held in a fixed position relative to their grooves and the inner peripheral wall surface of chamber 21, as shown in the drawings. Sealing rings 53 will remain in the position described above, providing a positive seal at all times between piston 39 and the walls of chamber 21, accordingly pressure changes occurring on either side of the piston will be instantly reflected in a movement of the piston and piston rod.

From the above disclosure it will be apparent there is provided a device capable of performing the various objects set forth above, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claim.

What is claimed is:

In a double acting reciprocating fluid motor including a cylinder, a piston reciprocable therein, and a piston rod connected to the piston, and wherein superatmospheric pressure constantly exists in the cylinder on opposite sides of the piston, the combination comprising: a single pair of spaced circumferential packing ring grooves in the piston; an endless pressure-deformable yielding packing ring in each of said grooves, each of said rings providing a pressure-tight seal between the piston and the opposed inner surface of the cylinder; and passageway means in the piston and piston rod providing communication between the atmosphere and the annular space defined by said rings, the peripheral surface portion of the piston therebetween, and the opposed inner surface of the wall of the cylinder, whereby said rings are constantly deformed toward each other during operation of the motor.

References Cited in the file of this patent

UNITED STATES PATENTS

| | | |
|---|---|---|
| 415,097 | Devlin | Nov. 12, 1889 |
| 674,234 | Christie | May 14, 1901 |
| 1,284,341 | Honegger | Nov. 12, 1918 |
| 1,339,939 | Alter | May 11, 1920 |
| 2,029,404 | Bard et al. | Feb. 4, 1936 |
| 2,314,683 | Berry | Mar. 23, 1943 |
| 2,424,901 | Richolt | July 29, 1947 |
| 2,437,814 | Hallen | Mar. 16, 1948 |
| 2,456,356 | Aber | Dec. 14, 1948 |
| 2,615,769 | Barnes et al. | Oct. 28, 1952 |
| 2,631,571 | Parker | Mar. 17, 1953 |

FOREIGN PATENTS

| | | |
|---|---|---|
| 548,291 | Great Britain | Oct. 5, 1942 |